US006199876B1

(12) United States Patent
Eckelberry

(10) Patent No.: US 6,199,876 B1
(45) Date of Patent: Mar. 13, 2001

(54) VEHICLE TRAILER SUSPENSION STABILIZER AND LIFT SYSTEM

(75) Inventor: Jim Eckelberry, Canton, OH (US)

(73) Assignee: Meritor Heavy Vehicle System, LLC, Troy, MI (US)

( * ) Notice: Subject to any disclaimer, the term of this patent is extended or adjusted under 35 U.S.C. 154(b) by 0 days.

(21) Appl. No.: 09/289,443

(22) Filed: Apr. 9, 1999

(51) Int. Cl.[7] ................................................ B60G 17/00
(52) U.S. Cl. ...................................... 280/6.151; 280/86.5
(58) Field of Search ............................... 280/6.151, 86.5

(56) References Cited

U.S. PATENT DOCUMENTS 1,175,545 * 3/1916 Morgan ............................. 280/6.151
4,568,094 * 2/1986 Lovell .............................. 280/6.151
5,340,141 * 8/1994 Thorndyke ........................ 280/6.151

* cited by examiner

Primary Examiner—Kenneth R. Rice
(74) Attorney, Agent, or Firm—Carlson, Gaskey & Olds

(57) ABSTRACT

A vehicle suspension system that is especially useful for truck trailer suspensions includes an adjustable support that stabilizes the vehicle when desired. The adjustable support preferably is hydraulic having a housing and a movable shaft. One end of the movable shaft preferably engages a receiver portion on a suspension beam to either adjust a position of the suspension beam relative to an underside of a truck trailer or to effectively lock the suspension beam into a desired position.

20 Claims, 2 Drawing Sheets

VEHICLE TRAILER SUSPENSION STABILIZER AND LIFT SYSTEM

BACKGROUND OF THE INVENTION

This invention generally relates to vehicle suspension systems. More particularly, this invention relates to a system for stabilizing a suspension system under selected conditions.

A variety of suspension systems are available for passenger and heavy duty vehicles. One type of suspension provided for heavy duty vehicles is air-based and includes the ability to adjust the position of an axle on a truck trailer. These suspensions are particularly useful for truck trailers that are optionally made into trains and transported by railway. When such a truck trailer is utilized for driving along the highway, for example, the suspension is adjusted into a first position where the wheels are spaced from the underside of the trailer a sufficient distance for driving along the road. When the trailer is to be transported by train, however, the suspension is adjusted so that the wheels are in a relatively retracted position, closer to the underside of the trailer. Since the wheels need to be adjusted into the two different positions, the suspension system must be adjustable to accommodate movement of the wheel axle between the two positions.

While such systems have proven useful and advantageous, they are not without shortcomings and drawbacks. For example, since the suspension system must accommodate movement of the axle between two relatively extreme positions, there is a requirement for a large amount of resiliency in the suspension system. This resiliency can pose problems under certain conditions.

For example, when loading a trailer, it is common to drive a lift truck onto the trailer bed. Because the lift truck is typically very heavy, a large load is rapidly imposed on the suspension system, which cannot react quick enough to avoid having the trailer bed drop suddenly as a result of the weight of the lift truck. This poses at least two problems. First, this provides undesirable wear on the trailer suspension components. Second, when the trailer is at a docking station, for example, it is necessary to maintain the truck bed at a height that enables a worker to easily move between the truck bed and the loading dock. When the truck bed drops because the air-based suspension system cannot accommodate the weight of a lift truck, for example, it may not be possible to drive the lift truck off of the trailer bed back onto the loading dock. In some instances, the air-based suspension system is not capable of being adjusted sufficient to raise the trailer bed back to a height consistent with the loading dock.

Additionally, when a lift truck is driven off of a trailer bed, the trailer bed often bounces upward in response to the force that is provided by the air-based suspension system, which has been under high pressure in an attempt to counteract the weight of the lift truck. Since the suspension system is provided with enough air to support the weight of the lift truck, when the lift truck leaves the trailer bed, the system is not able to adjust quickly enough to avoid the trailer bed being bounced upward. This undesirably increases the wear on the suspension components and can pose problems to the cargo that is loaded onto the trailer bed.

Therefore, there is a need for an improved suspension system that can be stabilized to avoid the shortcomings and drawbacks discussed above while still permitting the suspension system to be adjusted into the positions necessary to accommodate driving along a highway or being transported by railway. This invention addresses those needs by providing an improved suspension system.

SUMMARY OF THE INVENTION

In general terms, this invention is a vehicle suspension system that is selectively adjustable to provide stability during loading or unloading operations and to allow the suspension to be adjustable to accommodate different transportation scenarios.

A system designed according to this invention includes several basic components. An axle is provided to support wheels for the vehicle in a conventional manner. A suspension beam is associated with the axle and has at least one end that is moveable relative to the body of the vehicle so that the position of the axle relative to the body of the vehicle is adjustable. An adjustable support has a first end supported adjacent the body of the vehicle. A second end of the adjustable support is selectively moveable relative to the first end. The second end of the support preferably is received by a receiver portion on the suspension beam. The adjustable support controls a distance between the moveable end of the suspension beam and the vehicle body so that the distance between the vehicle body and the wheels is controlled. The adjustable support is selectively locked to maintain a fixed distance between the moveable end of the suspension beam and the vehicle body.

In the preferred embodiment, the adjustable support is hydraulic. A hydraulic version of the adjustable support preferably includes a housing at the first end of the support and a moveable shaft at the second end. The hydraulic support is adjusted so that the moveable shaft moves relative to the housing to adjust a distance between the first and second ends of the support. The receiver portion on the suspension beam preferably receives a terminal portion of the moveable shaft when the moveable shaft is moved appropriately.

The adjustable support can be used to stabilize a trailer bed during loading or unloading operations and provides the additional advantage of assisting an air-based suspension system to lift a trailer bed to a desired height.

Further details and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
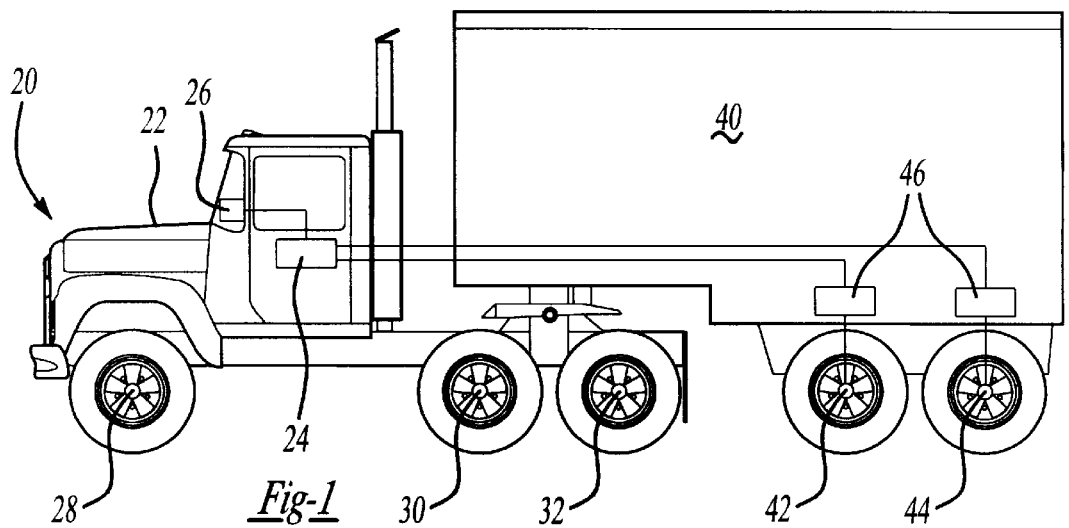
FIG. 1 diagrammatically illustrates a vehicle that includes a suspension system designed according to this invention.

FIG. 1 illustrates a truck 20 including a cab portion 22 that includes the engine compartment and driver compartment. The cab portion 22 preferably supports a controller 24 and an operator interface module 26. The cab portion 22 includes three wheel axles 28, 30 and 32, which operate in a conventional manner.

The truck 20 also includes a trailer portion 40. The illustrated embodiment includes two trailer wheel axles 42 and 44. Each of the trailer axles includes an adjustable support 46 that is schematically illustrated in FIG. 1. The adjustable support 46 provides stability to the suspensions associated with the axles 42 and 44 when necessary.

Figure 2:
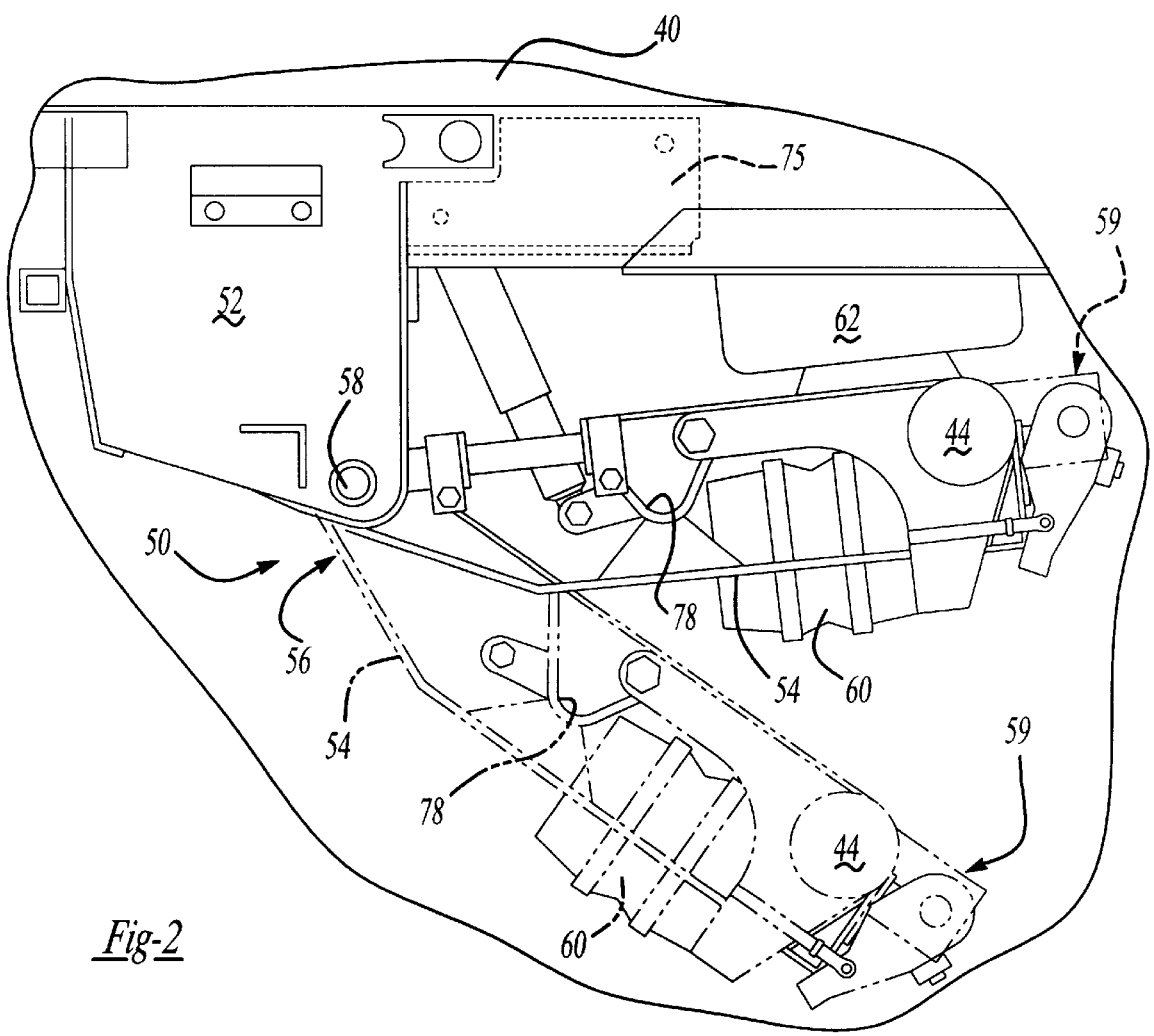
FIG. 2 diagrammatically illustrates selected portions of the suspension system designed according to this invention.

As shown in FIG. 2, the suspension 50 associated with the axle 44 is adjustable to accommodate different transportation requirements. The axle 44 is illustrated and the axle 42 preferably includes the same structural arrangement. The underside of the trailer 40 preferably includes a mounting structure 52 that supports a suspension beam 54. Preferably, a first end 56 of the suspension beam 54 is pivotally supported on the mounting structure 52 near a suspension beam pivot axis 58. A second end 59 of the suspension beam 54 is moveable relative to the trailer 40 so that the distance between the axle 44 and the underside of the trailer 40 can be adjusted as needed. FIG. 2 illustrates the suspension beam 54 in a first position that is commonly referred to as a "rail position" that is utilized when the trailer 40 is placed on a rail bogie for transportation by railway. The suspension beam 54 is also illustrated in FIG. 3 to illustrate a "ride height position" that is used when the trailer 40 is connected to a cab portion 22 to be driven along a highway, for example.

The suspension 50 is adjusted between the rail position and the ride height position primarily through an air-based suspension module that is diagrammatically, partially represented at 62. By selectively controlling the amount of air in the air-based suspension module in a conventional manner, the distance between the second end 59 of the suspension beam 54 and the underside of the trailer 40 can be controlled. Since air is compressible, the air suspension module not only biases the suspension beam 54 away from the underside of the trailer 40, but also provides cushion while in transit.

Since the suspension beam 54 needs to be adjustable between the two positions illustrated in FIG. 2, there must be a relatively wide range of movement available when desired. If only the air-based suspension module 62 were relied upon to provide the support necessary to maintain a desired distance between the suspension beam 54 and the underside of the trailer 40, there would be difficulties under certain loading or unloading conditions as described above. Therefore, this invention includes an adjustable support 46 to provide stability and adjustability features to the suspension 50.

Figure 3:
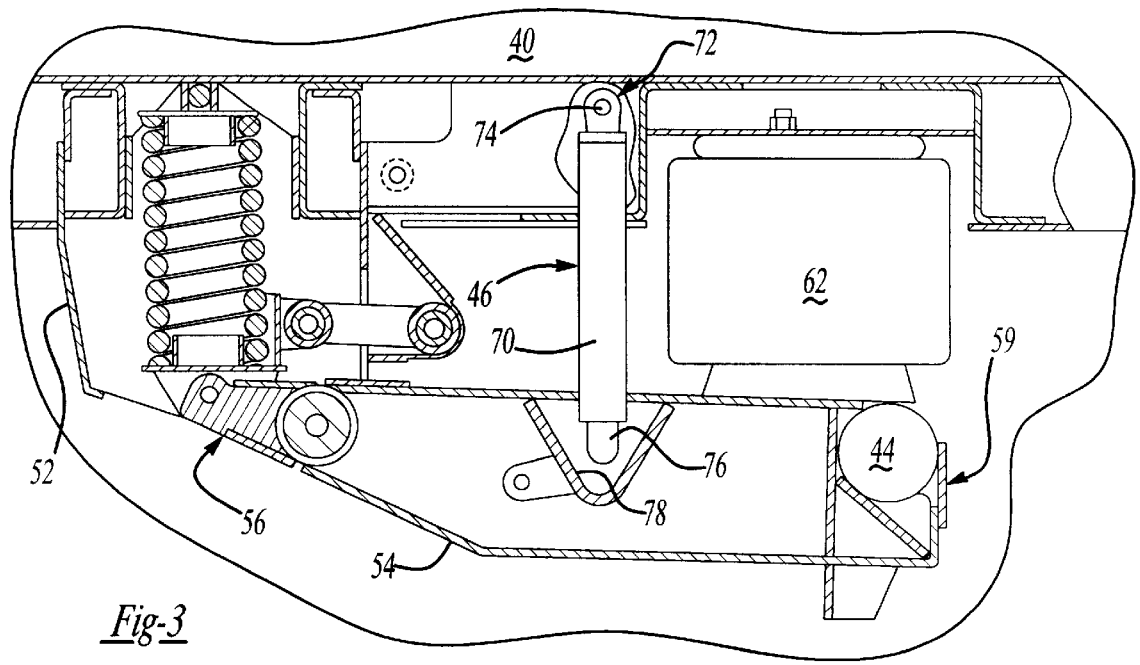
FIG. 3 diagrammatically illustrates other selected portions of the suspension system from a side view.
Figure 4:
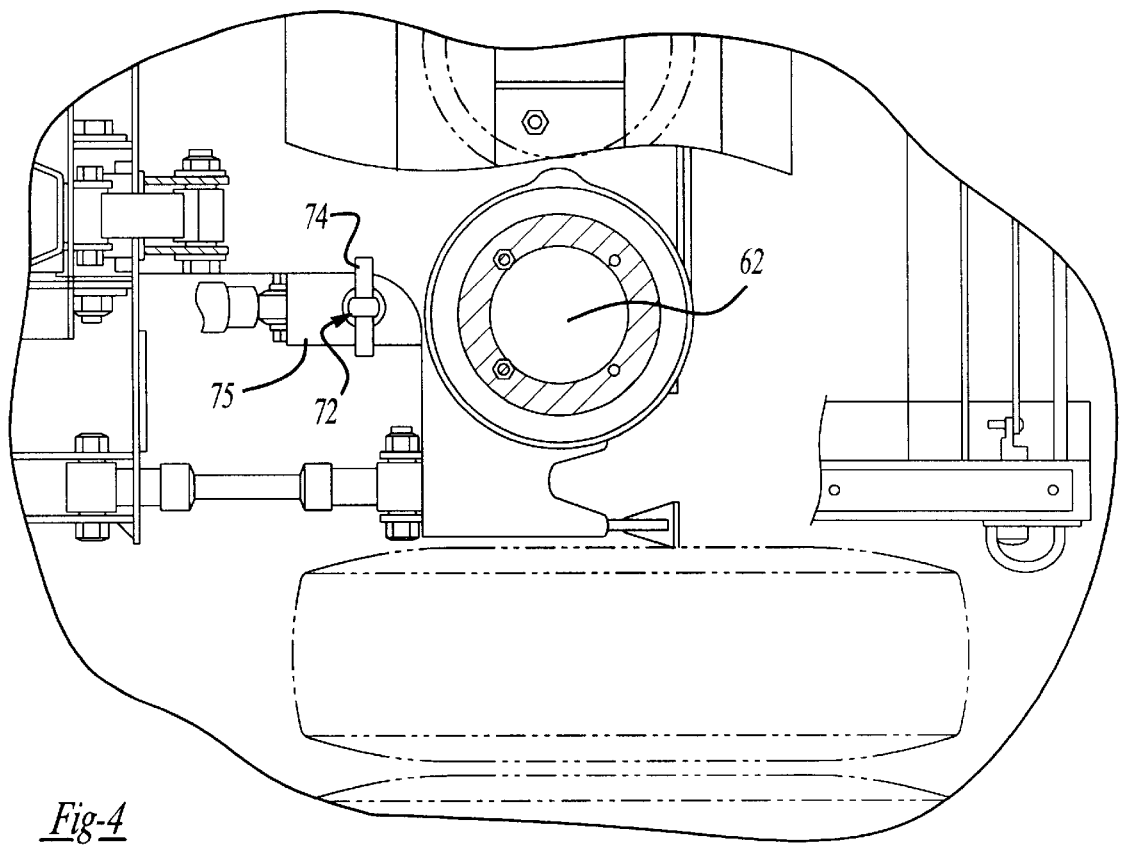
FIG. 4 illustrates the portions of FIG. 3 from a top view.

FIG. 3 diagrammatically illustrates a preferred embodiment of an adjustable support 46. The adjustable support 46 preferably is hydraulic and includes a housing 70. A first end 72 of the support 46 preferably is supported on the underside of the trailer 40 so that the support 46 can pivot about a support pivot axis 74. In the illustrated example, the pivot axis 74 is coincident with a mounting pin 74 that cooperates with a mounting structure 75 on the underside of the trailer 40 to securely mount the support 46 (as can be appreciated from FIG. 4, for example). The support 46 also includes a moveable member 76, which preferably is a shaft that is at least partially received within the housing 70. The shaft 76 has a terminal end that engages a receiver portion 78 on the suspension beam 54.

The receiver portion 78 preferably is a pocket that is a part of the suspension beam 54. The receiver portion 78 can be integrally formed as part of a suspension beam or can be made as a separate component that is rigidly secured to the suspension beam. As shown in FIG. 3, the receiver portion 78 preferably includes a generally curved receiving surface and the moveable shaft 76 preferably includes a rounded terminal end. The rounded surfaces on the receiver portion 78 and the shaft 76 accommodate maintaining contact between the support 46 and the suspension beam 54 as the suspension beam 54 pivots about the beam pivot axis 58. The pivotal mounting of the support 46 on the underside of the trailer further facilitates a stable contact between the shaft 76 and the receiver portion 78.

The suspension 50 preferably is used in the following general manner. Under most driving conditions, the air-based suspension module 62 is utilized to bias the suspension beam 54 away from the underside of the trailer 40. Under all driving conditions, the adjustable support 46 is adjusted so that the moveable shaft 76 is retracted into the housing 70 and does not contact the receiver portion 78 on the suspension beam 54.

Under certain conditions, such as when loading or unloading the trailer 40 at a loading dock, the adjustable support 46 preferably is utilized to stabilize the trailer bed. The support 46 is adjusted so that the moveable shaft 76 moves outward relative to the housing 70 and engages the receiver portion 78 on the suspension beam 54. When the suspension beam 54 is in a desired position relative to the underside of the trailer 40, the moveable shaft 76 preferably is locked in place. This can be accomplished, for example, by closing the valves in the hydraulic supply system (not illustrated) that is utilized to adjust the position of the shaft 76. Since hydraulic fluid is not compressible, the adjustable support 46 prevents the trailer bed from undesirably dropping toward the suspension beam 54 as would have occurred under some circumstances where only the air-based suspension module 62 was utilized. Whenever a loading operation, for example, is completed, the moveable shaft 76 can be retracted back into the housing 70 and the vehicle can be used as desired.

When the suspension system is utilized as described in the previous paragraph, it is most preferred that the controller 24 controls the operation of the adjustable support 46. Once the adjustable support 46 is moved into a desired position and locked, the air-based suspension module 62 can be automatically vented if needed. Once the trailer 40 is fully loaded or unloaded, the controller 24 preferably adjusts the bias provided by the air-based suspension module 62 to accommodate the desired spacing between the suspension beam 54 and the underside of the trailer 40 before the adjustable support 46 is disengaged.

An additional use for the adjustable support 46 of this invention is to assist the air-based suspension module 62 in adjusting the trailer height as shown in phantom in FIG. 2 for connecting the trailer 40 to a rail bogie, for example, where the trailer is loaded too heavy for the air-based system to make a needed adjustment on its own.

An operator input device 26 preferably is provided in the cab portion 22 to allow a vehicle operator to selectively activate or deactivate the adjustable support 46 and the air-based suspension module 62. The controller 24 responds to operator input and controls the suspension accordingly. Alternatively, a controller can be provided on a separate device that allows an operator to interface with the adjustable support 46 and the air-based suspension module 62 to make adjustments when a trailer 40 is placed at a loading dock, for example. Given this description, those skilled in the art will be able to utilize commercially available microprocessors or computers and to program them to perform the functions of the controller 24.

Although this invention has been described in relation to a truck trailer suspension, it is not limited in use to that particular application. Additionally, although the adjustable support 46 preferably is hydraulic, other adjustable mechanisms may be utilized. Given this description, those skilled in the art will be able to determine what kind of adjustment mechanism best suits the needs of a particular situation.

The description given above is exemplary rather than limiting in nature. Variations and modifications to the disclosed example may become apparent to those skilled in the art that do not necessarily depart from the basis of this invention. The scope of legal protection given to this invention can only be determined by studying the following claims.

What is claimed is:

1. A vehicle suspension system, comprising:
    an axle that is adapted to support at least one wheel;
    a suspension beam associated with the axle, the suspension beam having a first end and a second end, at least one of the ends being moveable relative to the vehicle, the suspension beam including a receiver portion; and
    an adjustable support having a first end supported adjacent the vehicle and a second end that is selectively moveable relative to the first end, the second end being selectively received by the suspension beam receiver portion only when desired such that the support controls a distance between the moveable end of the suspension beam and the vehicle and the support is selectively locked such that a distance between the support first and second ends remains fixed thereby maintaining a selected distance between the moveable end of the suspension beam and the vehicle.

2. The system of claim 1, wherein the adjustable support is hydraulic.

3. The system of claim 2, wherein the hydraulic support comprises a hydraulic cylinder having a housing at the first end and a moveable shaft at the second end and wherein the moveable shaft is selectively moved relative to the housing to selectively adjust the distance between the first and second ends.

4. The system of claim 3, wherein the receiver portion comprises a pocket on the suspension beam and wherein the hydraulic support second end is received within the pocket.

5. The system of claim 4, wherein the receiver portion is integrally formed as part of the suspension beam.

6. The system of claim 4, wherein the receiver portion is rigidly secured to the suspension beam.

7. The system of claim 1, wherein the adjustable support is selectively adjustable between a first position wherein the second end does not contact the suspension beam and a second position wherein the second end engages the receiver portion of the suspension beam.

8. The system of claim 7, including a plurality of second positions such that the hydraulic support is selectively adjustable to thereby adjust a distance between the suspension beam and the vehicle.

9. The system of claim 1, wherein the adjustable support is hydraulic and the system includes an air suspension module that biases the moveable end of the suspension beam away from the vehicle and wherein the air suspension module is selectively adjustable to provide a selected strength to the bias on the suspension beam and including a controller that is operative to adjust the strength of the bias and wherein the controller controls the hydraulic support to thereby control a distance between the suspension beam moveable end and the vehicle when the strength of the bias is insufficient to maintain the distance at a desired distance.

10. The system of claim 1, wherein the adjustable support is hydraulic and the support first end is pivotally supported by the vehicle and the suspension beam first end is pivotally supported by the vehicle such that the suspension beam second end is the moveable end and the suspension beam moves relative to the vehicle about a beam pivot axis at the first suspension beam end, the second end of the hydraulic support being moveable about a support pivot axis at the hydraulic support first end such that the hydraulic support second end remains in contact with the receiver portion as the suspension beam pivots about the beam axis during selected adjustment of the support.

11. A truck trailer wheel axle suspension system, comprising:
    a suspension beam associated with the axle, the suspension beam having at least one portion that is moveable relative to an underside of the trailer;
    an air cushion module that biases the suspension beam moveable portion away from the underside of the trailer; and
    an adjustable support having a first end supported adjacent the underside of the trailer and a second end that is moveable relative to the first end from a first position where the second end does not contact the suspension beam and a second position where the second end engages the suspension beam, the adjustable support being selectively adjustable and lockable to adjust a position of the suspension beam moveable portion relative to the underside of the trailer and to selectively maintain the suspension beam into a selected position.

12. The system of claim 11, wherein the adjustable support comprises a hydraulic support.

13. The system of claim 12, wherein the hydraulic support includes a housing at the first end and a moveable shaft at the second end including a terminal portion that engages the suspension beam when the support is in the second position.

14. The system of claim 13, wherein the suspension beam includes a receiver portion that receives the terminal portion of the moveable shaft when the support is in the second position.

15. The system of claim 11, wherein the suspension beam includes a first end that is supported underneath the trailer and includes a beam pivot axis adjacent the first end and a second end that is moveable relative to the underside of the trailer as the beam moves about the beam pivot axis and wherein the adjustable support first end includes a support pivot axis such that the support moves about the support axis as the support second end moves with the beam as the beam pivots about the beam pivot axis.

16. The system of claim 15, wherein the adjustable support second end includes a moveable shaft that is received by a receiver portion on the suspension beam and wherein the receiver portion includes a generally curved receiver surface that is engaged by a terminal portion of the shaft when the support is in the second position.

17. A vehicle suspension system, comprising:
    an axle that is adapted to support at least one wheel;
    a suspension beam associated with the axle, the suspension beam having a first end and a second end, at least one of the ends being moveable relative to the vehicle, the suspension beam including a receiver portion; and
    an adjustable support having a first end supported adjacent the vehicle and a second end that is selectively moveable relative to the first end, the second end being received by the suspension beam receiver portion such that the support controls a distance between the moveable end of the suspension beam and the vehicle and the support is selectively locked such that a distance between the support first and second ends remains fixed thereby maintaining a selected distance between the moveable end of the suspension beam and the vehicle;

wherein the adjustable support is hydraulic and comprises a hydraulic cylinder having a housing at the first end and a moveable shaft at the second end and wherein the moveable shaft is selectively moved relative to the housing to selectively adjust the distance between the first and second ends; and wherein the receiver portion comprises a pocket on the suspension beam and wherein the hydraulic support second end is received within the pocket.

18. The system of claim 17, wherein the receiver portion is integrally formed as part of the suspension beam.

19. The system of claim 17, wherein the receiver portion is rigidly secured to the suspension beam.

20. A vehicle suspension system, comprising:

an axle that is adapted to support at least one wheel;

a suspension beam associated with the axle, the suspension beam having a first end and a second end, at least one of the ends being moveable relative to the vehicle, the suspension beam including a receiver portion; and an adjustable support having a first end supported adjacent the vehicle and a second end that is selectively moveable relative to the first end, the adjustable support is selectively adjustable between a first position wherein the second end does not contact the suspension beam and a second position wherein the second end engages the receiver portion of the suspension beam, the second end being received by the suspension beam receiver portion such that the support controls a distance between the moveable end of the suspension beam and the vehicle and the support is selectively locked such that a distance between the support first and second ends remains fixed thereby maintaining a selected distance between the moveable end of the suspension beam and the vehicle.

\* \* \* \* \*